P. A. ROSENTHAL.
TIRE PLUG.
APPLICATION FILED JULY 22, 1911.

1,014,851.

Patented Jan. 16, 1912.

Witnesses:
E. A. Jarvis
Estelle O. Hamburger

Inventor:
Philip A. Rosenthal
by Tobias L. Keppler
attorney.

COLUMBIA PLANOGRAPH CO., WASHINGTON, D. C.

UNITED STATES PATENT OFFICE.

PHILIP A. ROSENTHAL, OF NEW YORK, N. Y.

TIRE-PLUG.

1,014,851.  Specification of Letters Patent.  Patented Jan. 16, 1912.

Application filed July 22, 1911. Serial No. 640,047.

*To all whom it may concern:*

Be it known that I, PHILIP A. ROSENTHAL, a citizen of the United States of America, residing at New York city, Manhattan borough, county and State of New York, have invented certain new and useful Improvements in Tire-Plugs, of which the following is a full, clear, and exact description.

This invention relates to an improvement in tire plugs which are adapted for application to a tire when a puncture has occurred, the function of the plug being to cover the punctured portion of the tire.

My invention is particularly adapted for single tube pneumatic tires and is composed preferably of metal and so designed as to preclude the air within the tire from escaping through the connected parts of the plug, after the said plug has been affixed to the tire.

Further features of my improved plug will be hereinafter set forth.

Figure 1:
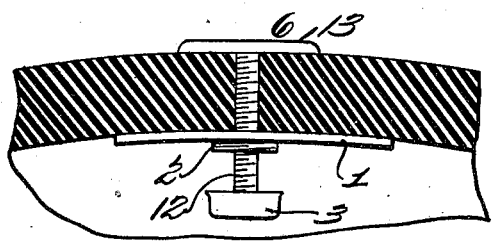
Figure 2:
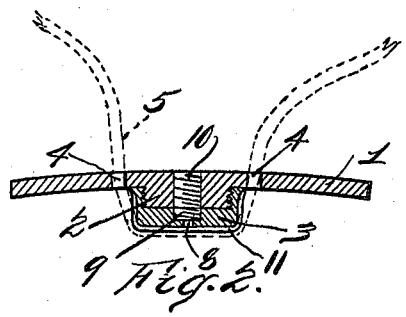
Figure 4:
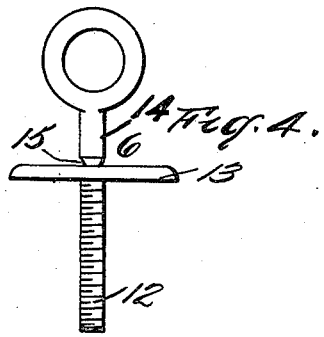
Figure 3:
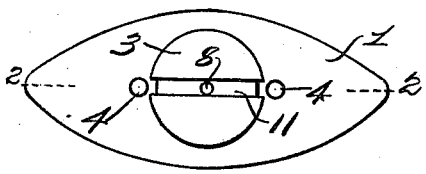
Figure 5:
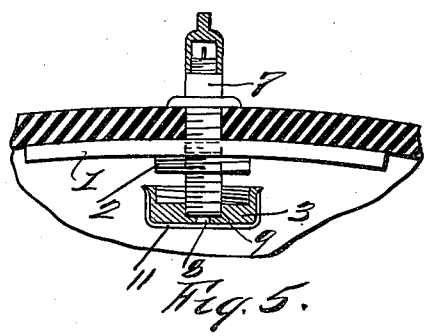

I will now proceed to describe my invention in detail, the novel features of which will be pointed out in the claims, reference being had to the accompanying drawing, forming part hereof, wherein:

Figure 1 is a sectional view of a portion of a single tube tire showing my improved plug in position; Fig. 2 is a sectional detail view of the base portion thereof, the section being taken on a line 2—2 in Fig. 3; Fig. 3 is a bottom plan view of the said base portion; Fig. 4 is one form of cap member that can be used in connection with my improved base portion; and Fig. 5 is a sectional view of a portion of a single tube tire showing my improved base portion applied to a tire valve.

One of the chief objects of my invention is to provide a base portion for tire plugs so constructed as to adapt it for use in connection with a cap member having a shank of a fixed length, the said shank and base portion being adapted for connection one to the other. By providing a base portion, as above described, tires of different thickness can be plugged, and it obviates the necessity of providing cap members having shanks of various lengths.

Referring to Figs. 2 and 3 of the drawings, it will be seen that my improved base portion consists of an elliptical plate 1. The said plate 1 is provided with a threaded lug 2 upon which a guard 3 is adapted to fit. The guard 3 is threaded as shown, to engage the threads on the lug 2. The plate 1 is provided with openings 4 adjacent the lug 2, through which a thread or string, indicated by 5 in Fig. 2, is passed when the base portion is to be passed or forced through a puncture in order that the said base portion can be held, while a cap member 6 (Fig. 4) is being applied, or while a tire valve 7 (Fig. 5) is being applied.

By referring to Fig. 2 it will be seen that the guard 3 is provided with a small opening 8 which is in communication with the threaded opening 9 in the said guard 3. The threaded opening 9 is in alinement with a threaded opening 10 in the plate 1 and lug 2. The opening 8 is provided for the purpose of permitting air to flow into the tire through the valve 7, when the base portion is used in connection with a valve.

To prevent the cord 5 from slipping off the guard 3, while the base-portion is being applied, I provide a groove 11 in the said guard 3. The function of the guard 3 is to cover the lower end of the shank 12 of the cap member 6 to prevent the said shank from cutting the adjacent lower inner surface of the tire by coming in contact therewith should the tire be deflated, wholly or partly.

To apply a plug, the base portion is passed through the puncture, one of the pointed ends being inserted in the puncture and the whole base portion forced therethrough, the ends of the cord 5 being held by the fingers. After the base portion has been forced through the puncture the said base portion is pulled up against the inner surface of the tire to the position shown in Fig. 1 by means of the cord. The shank 12 of the cap member 6 is then passed through the puncture and caused to engage the threaded opening 10 in the base portion; a continued turning of the cap 6 will cause the shank to engage the threaded opening 9 in the guard 3. After the shank 12 has reached the bottom of the threaded opening 9 the guard 3 will turn with the shank and unscrew from the lug 2, this because of the fact that the threads of the shank and guard are right-handed. When the plate 13 of the cap member 6 has been screwed home or caused to contact with the tire, as shown in Fig. 1, the shank 14 or manipulating shank of the cap-member 6 will break off at the partly severed portion 15.

By means of the protecting guard 3 the end of the shank 12 is prevented from contacting with the lower inner surface of the tire. For that reason it is not necessary to provide caps having shanks 12 of different lengths to accommodate tires of various sizes.

The object of providing the partially severed portion 15 is to weaken the shank 14, in order that the said shank will break at the said portion 15 when any great amount of strain is imposed on the shank by the turning of the cap, thereby obviating the use of a file or other cutting devices to cut the shank after the plate 13 has been screwed home. The strength of the shank 14 will be such at the partially severed portion 15 as to adapt the plate 13 to firmly contact with the surface of the tire before the said shank will break. That is to say, the strength of the shank at the partially severed portion will be sufficient to permit the base member and cap member to firmly contact with their respective surfaces of the tire before the shank will break. The object of making the plate of the cap integral with the shanks thereon is to obviate any chances of leakage between the plate of the cap and the shank which passes through the puncture and into the base portion. Furthermore, should a cap be imperfect, the said cap can be removed by the means of a pair of pliers, even though the shank 14 be broken. It will, of course, be understood that I may use caps of a size to cover the puncture.

Having now described my invention, what I claim and desire to secure by Letters Patent is:

1. A tire plug comprising a base portion consisting of a plate having an opening, a lug carried by said plate and surrounding said opening, a guard removably mounted on said lug also provided with an opening in alinement with the opening in said plate, a cap member, and a shank carried by said cap member adapted to engage the opening in said plate and said guard.

2. A tire plug comprising a base portion, consisting of a plate having a threaded opening, an exteriorly threaded lug carried by said plate, and surrounding the opening therein, a threaded guard removably mounted on said threaded lug also provided with a threaded opening in alinement with the threaded opening in said plate, a cap member, and a threaded shank carried by said cap member adapted to engage the threaded openings in said plate and said guard.

3. A plate adapted for insertion in a tire, having a threaded opening, an exteriorly threaded lug carried by said plate and surrounding said opening, a threaded guard carried by said threaded lug, having a threaded opening in alinement with the opening in said plate, said guard being provided with a relatively small opening in communication with the threaded opening therein.

4. A tire plug comprising a base member, a lug carried by said base member having a threaded opening, a guard carried by said lug, said guard being provided with a groove extending over the end thereof and down the side thereof, said base member being provided with openings adjacent said lug and in alinement with the groove in said guard, a cap member, a threaded shank carried by said cap member and integral therewith, said threaded shank being adapted to engage the threads in the opening in said lug, and a manipulating shank also carried by said cap, the shank last named being partially severed adjacent the point of meeting of said shank and said cap.

Signed at New York city, N. Y. this 12th day of July 1911.

PHILIP A. ROSENTHAL.

Witnesses:
EDWARD A. JARVIS,
ESTELLE O. HAMBURGER.

Copies of this patent may be obtained for five cents each, by addressing the "Commissioner of Patents, Washington, D. C."